[Patent No.] 3,377,251
[Patented] Apr. 9, 1968

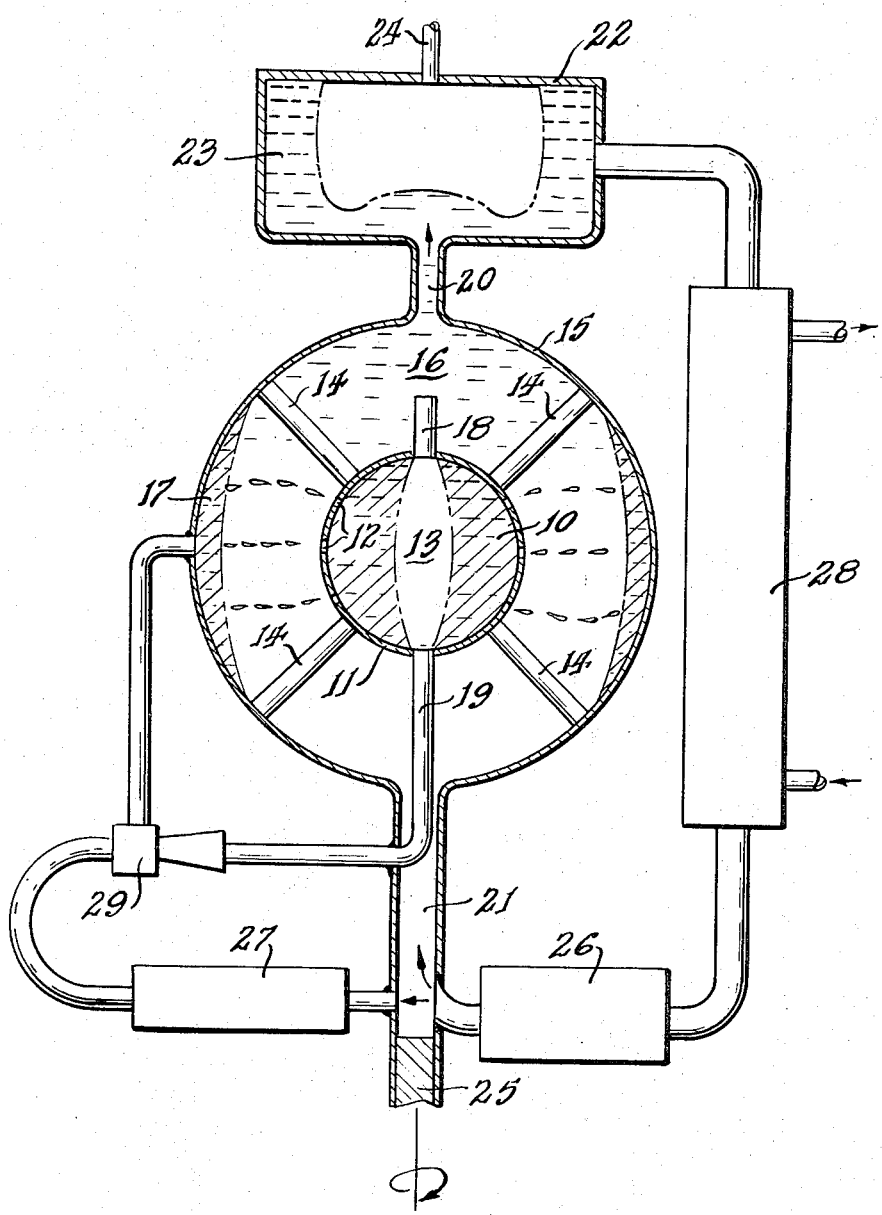

3,377,251
NUCLEAR REACTOR FOR USE IN SPACE
Howard E. Hanthorn and Harold Harty, Richland, Wash.,
assignors to the United States of America as represented by the United States Atomic Energy Commission
Filed May 24, 1967, Ser. No. 642,660
5 Claims. (Cl. 176—29)

ABSTRACT OF THE DISCLOSURE

A nuclear reactor incorporating a molten plutonium alloy as fuel and liquid sodium as coolant designed primarily for use in a low-gravity environment. Centrifugal force created by rotation of the reactor causes drops of the fuel alloy to flow outwardly from the core through the sodium coolant. The reactor is controlled by varying the rate of rotation of the reactor and the rate of return of the fuel to the core.

Contractual origin of the invention

The invention described herein was made in the course of, or under, a contract with the United States Atomic Energy Commission.

Background of the invention

This invention relates to a nuclear reactor adapted for use in space which may be controlled automatically and remotely and to a method of operating this reactor. In more detail, the invention relates to a nuclear reactor which is rotated to create artificial gravity for the reactor and which can be controlled by varying the rate of rotation of the reactor.

Nuclear reactors to be useful in space must be small and light; they must be easy to control; and, of overriding importance, they must be completely dependable. In addition, the designer of a nuclear reactor to be used in space must take into consideration the lack of gravitation away from the earth's surface. These and other considerations make it impossible merely to adapt a conventional reactor design to build a reactor for use in space. For example, LAMPRE-I—The Los Alamos Molten Plutonium Reactor Experiment—which was constructed at Los Alamos Scientific Laboratory to show the practicability of molten plutonium as a fuel, could not be adapted directly to space use. Yet nonsolid fuels such as molten plutonium have such great advantages—for example, large burnup and high heat transfer rates—as to make molten plutonium a good choice for a fuel for a space reactor.

Any reactor, to be useful in space, must be absolutely dependable due to the difficulty or impossibility of servicing the reactor. Thus simplicity and ease of operation are key characteristics of a desirable control system for such a reactor. Conventional moving control rods are not desirable for such a reactor, since they require movement within a high neutron flux at a high temperature under conditions that would make malfunctions not too unlikely.

It is accordingly an object of the present invention to develop a reactor adapted for space use which is easily controlled automatically and, if necessary, remotely and requires no moving parts inside the reactor core.

It is also an object of the present invention to develop a method of controlling a reactor which provides assured, rapid, trouble-free control action.

Summary of the invention

According to the present invention, a nuclear reactor core consisting of a critical mass of a molten plutonium alloy is confined at the center of a mass of liquid sodium. Centrifugal force arising from rotation of the reactor causes drops of the plutonium alloy to flow through orifices in the confinement means and to pass through the liquid sodium to its periphery. The reactor is controlled by controlling the rate of rotation of the reactor and the rate of return of fuel alloy to the core.

Brief description of the drawing

The single figure of the drawing is a schematic representation, taken partly in cross section, of a nuclear reactor according to the present invention. The configuration shown is that attained when the entire assembly is rotated around the indicated axis.

Description of the preferred embodiments

The reactor comprises a core 10 consisting of a critical mass of a molten plutonium-iron alloy confined within a spherical inner shell 11 having a plurality of orifices 12 therein. As shown in the drawing, the fuel alloy takes on an annular configuration surrounding a central void 13 due to the rotation of the reactor. Concentrically surrounding shell 11 and spaced therefrom by struts 14 is a spherical outer vessel 15 which is substantially filled with a mass 16 of liquid sodium. A reservoir 17 of fuel alloy is also located in vessel 15 and, as will become apparent hereinafter, is disposed in an equatorial band about the periphery of the vessel during operation of the reactor.

Shell 11 has opposed tubes 18 and 19 attached thereto, tube 18 serving as outlet and tube 19 serving as inlet for shell 11. Outlet tube 18 terminates within the mass 16 of sodium in vessel 15 while inlet tube 19 extends to the exterior of the vessel. Orifices 12 are distributed in a band around the equator of shell 11.

Vessel 15 has opposed tubes 20 and 21 attached thereto which are arranged in a line with tubes 18 and 19, tube 20 serving as outlet for vessel 15 and tube 21 serving as inlet. Tube 20 connects vessel 15 to reservoir 22 containing a mass 23 of sodium taking the form shown due to the rotation of the reactor. The empty space in reservoir 22 is filled with a pressurizing gas through line 24 to accommodate changes in the volume of sodium in the reservoir. Tube 19 is smaller in diameter than is tube 21 and is coaxial therewith. Accordingly, only a single penetration of vessel 15 is necessary. Tube 21 blends into axle 25 with which the reactor is rotated. Thus the inlet and outlet tubes of shell 11 and vessel 15 define the axis of rotation of the reactor.

To circulate the fuel alloy and the coolant two electromagnetic pumps 26 and 27 are provided. One circuit includes pump 26 and heat exchanger 28 and the other circuit includes pump 27 and eductor 29.

Operation and control of the reactor will next be described. Electromagnetic pump 26 draws liquid sodium from reservoir 22 through heat exchanger 28 and returns the sodium to vessel 15 through tube 21. In heat exchanger 28 the sodium heats a secondary coolant which is used, for example, to operate a turbine. Electromagnetic pump 27 draws sodium from the first circuit and forces the sodium through eductor 29, thereby drawing molten fuel alloy from reservoir 17 and injecting the mixture into shell 11. Here the two metals separate under the influence of centrifugal force, the fuel being thrown outwardly to become a part of core 10 and the sodium proceeding through the shell 11 and out into the mass 16 of sodium in vessel 15 through outlet tube 18. Simultaneously, the molten fuel alloy flows through orifices 12 in shell 11, "falls" through the liquid sodium in vessel 15 and enters fuel reservoir 17. The amount of fuel alloy in shell 11 is determined by an equilibrium between the pumping rate of pump 27 and the rate of flow of fuel alloy through orifices 12. If the rate of rotation is increased, the head against the orifices will be temporarily increased and the flow through the orifices also will temporarily increase until the new position of the fuel alloy-liquid sodium interface gives the same equilibrium head on the orifices as before. But the new interface occurs with less fuel and more sodium in the reactor core than before. Therefore reactivity is reduced.

Pump 27 provides on-off and shim control for the reactor. The reactor shell 11 and vessel 15 are so proportioned in size that the reactor will become critical with a reasonably sized central void with both fresh fuel and highly burned-out fuel, and so that the total assembly will be subcritical when all of the fuel alloy is in reservoir 17 and will remain subcritical until enough fuel is in core 10 to make it critical.

Although the reactor would be subcritical when all the fuel alloy is spread in an equatorial band about the periphery of the vessel 15, this would not be true for the case where all of the fuel is disposed in a pool at one side of vessel 15 at it would be when the reactor is launched. Thus means (not shown) are provided for reducing the reactivity of such a pool to below criticality. This may take the form of strips or pyramids of a material of high neutron capture cross section disposed on the interior of the vessel 15 in such a way that they would extend up into such a pool.

Orbital startup of the reactor is as follows: The reactor is rotated by an auxiliary power source till all of the fuel is in the reservoir. The rate of rotation is then increased until the capacity of pump 27 to maintain crictiality is exceeded. Pump 27 is then started at its design rate for fresh fuel. The rate of rotation of the reactor is then slowly reduced until the core becomes critical. A strong neutron source for startup is provided by dissolving a little beryllium in the fuel.

As burnout of the fuel occurs, the amount of fuel necessary to maintain criticality increases, and the rate of rotation correspondingly decreases under the influence of the control system. When the rate of rotation decreases to the extent that the forces available may not provide assured, rapid, trouble-free control action, the rate of rotation of the reactor is brought up to the startup rate (thus shutting down the reactor), the pumping rate of pump 27 is raised to the calculated shim rate for partially burned fuel, and the rate of rotation of the reactor is slowly lowered until criticality occurs.

The reactor is scrammed simply by stopping pump 27. Fuel would then be lost from core 10 through orifices 12 and would not be replaced. Usual inputs to a scram circuit are employed and in addition an input is employed to detect sharp decreases in rotation rate. In the event of failure somewhere in the power train causing rotation, the molten fuel would continue to swirl in shell 11 and fuel would pass outwardly through orifices 12 for a long enough time after pump 27 was stopped to shut the reactor down.

The following table gives the parameters of two reactors according to the present invention. One of these uses a slow rate of rotation to attain an acceleration of one gravity at the shell 11. Such a reactor would be useful in space. The other uses a rapid rate of rotation to attain an acceleration of 20 gravities at shell 11 such as would be necessary to overcome the earth's gravitation and could be operated on the surface of the earth.

| | |
|---|---|
| Reactor design thermal power | 4.0 mw. |
| Design electrical power | 1.0 mw. |
| Typical composition of liquid plutonium fuel: | |
|   Pu | 97.6%. |
|   Fe | 2.4%. |
| Critical mass of liquid Pu, liquid sodium reflected | 26.0 kg. |
| Additional Pu for criticality at design power | 8.0 kg. |
| Additional Pu for nuclear poisons and fuel burnup | 10.0 kg. |
| Total mass of plutonium required | 44.0 kg. |
| Total mass of fuel required | 45.1 kg. |
| Volumetric plutonium content of fuel | 14.0 g. Pu/cm.$^3$. |
| Volume of fuel required | 3.14 liters. |
| Volume of fuel required for criticality at power | 2.43 liters. |
| Estimated radius of sodium core under operating conditions | 3.0 cm. |
| Radius (inside) of reactor vessel | 8.88 cm. |
| Thickness of reactor vessel | 0.62 cm. |
| Radius (outside) of reactor vessel | 9.50 cm. |
| Fuel operating temperatures: | |
|   Inlet | 430° C. |
|   Outlet | 650° C. |
| Sodium operating temperatures: | |
|   Inlet | 430° C. |
|   Outlet | 630° C. |
| Specific heat of the fuel alloy | 0.19 Cal./g.-° C. |
| Heat capacity of the fuel alloy | 41.8 Cal./g. |
| Required circulation rate of fuel | 22.86 kg./sec., 1.63 liters/sec. |
| Required circulation rate of pumping sodium for fuel circulation, estimated | 3.0 liters/sec. |
| Specific heat of liquid sodium | 0.3 Cal./g.-° C. |
| Heat capacity of liquid sodium | 60 Cal./g. |
| Required circulation rate of sodium for heat transport | 18.9 kg./sec., 23.6 liters/sec. |
| Material of construction | Tantalum or tantalum - tungsten alloy. |
| For an assumed acceleration at the reactor wall of 1 $g$: | |
|   Rate of rotation | 1.67 r.p.s. |
|   Assumed number of holes in reactor wall for fuel distribution | 1000. |
|   Hole diameter | 0.35 cm. |
|   Hole pattern: 10 rows of holes at 100 holes/row at mid-circumference of vessel. | |
|   Fuel-sodium contact time for outer sphere inside radius 29.5 cm. | 0.178 sec. |
|   Fuel in transit during this time | 0.290 liter. |
|   Fuel drops in transit, assumed drop diameter=0.3 cm. | 20,510. |
|   Surface area of drops | 5,800 cm.$^2$. |
|   Surface area of reactor | 1,130 cm.$^2$. |
|   Total area for heat transfer | 6,930 cm.$^2$. |
|   Estimated effective temperature difference for heat transfer (cross-flow) | 100 ° C. |
|   Required heat transfer coefficient | 1.38 Cal./cm.$^2$-sec.-° C. |
|     Equivalent in English units | 10,200 B.t.u./ft.$^2$-hr.-° F. |
| For an assumed acceleration at the the reactor wall of 20 $g$, and same hole pattern: | |
|   Rate of rotation | 7.48 r.p.s. |
|   Hole diameter | 0.167 cm. |
|   Fuel-sodium contact time (same outer sphere radius) | 0.0398 sec. |
|   Fuel in transit during this time | 0.065 liter. |
|   Fuel drops in transit, assumed diameter=0.14 cm. | 45,140. |
|   Surface area of drops | 2,780 cm.$^2$. |
|   Total area for heat transfer | 3,910 cm.$^2$. |
|   Required heat transfer coefficient, English units | 21,000 B.t.u./ft.$^2$-hr.-° F. |
| Thickness of fuel band in outer vessel, subcritical configuration | 1.44 cm. |

Pool depth of fuel at one side of outer sphere (would be critical) _____ 6.0 cm.
Estimated total mass of fuel plus primary sodium, including reservoirs and piping _____ 83.54 kg.
Estimated total mass of reactor structure, assumed tantalum-tungsten alloy _____ 200.0 kg.
Estimated mass of EM pumps _____ 50.0 kg.
Total estimated mass of reactor and primary coolant system _____ 333.5 kg.

It will be understood that the invention is not to be limited to the details given herein but that it may be modified within the scope of the appended claims.

The embodiments of the invention in which an exclusive property or privilege is claimed are defined as follows:

1. A nuclear reactor adapted for use in a low gravity environment comprising an inner shell containing as fuel a mass of molten plutonium or plutonium alloy, an outer vessel containing as coolant a mass of liquid sodium surrounding said inner shell, said shell and vessel having the same axis of rotation, said shell having a plurality of orifices distributed in a band around the equator thereof whereby rotation of the reactor causes drops of fuel to pass through these orifices and traverse the mass of sodium to the periphery thereof, and means for returning the fuel to the interior of the shell.

2. A nuclear reactor according to claim 1 wherein said means for returning the fuel to the interior of the shell includes an eductor for drawing fuel from the periphery of the mass of sodium operated by sodium drawn from the outer vessel.

3. A nuclear reactor according to claim 2 wherein aligned inlet and outlet tubes are connected to the exterior of the inner shell, the axis of rotation falling on the line of the said inlet and outlet tubes, the outlet from the eductor being connected to the inlet tube and the outlet tube terminating in the mass of sodium whereby a mixture of fuel and sodium is returned to the inner shell, the fuel being directed outwardly in the shell by centrifugal force and the sodium proceeding through the shell and through the outlet tube.

4. A nuclear reactor according to claim 3 and including inlet and outlet pipes connected to the exterior of the outer vessel, a reservoir for sodium connected to the vessel by the outlet pipe, a heat exchanger and an electromagnetic pump for drawing sodium from the reservoir through the heat exchanger and returning it to the vessel through the inlet pipe, said inlet pipe being of greater diameter than said inlet tube and the tube passing through said pipe.

5. A method of operating a molten-plutonium-fueled, liquid-sodium-cooled nuclear reactor comprising confining molten plutonium or a molten plutonium alloy in a rotatable shell having openings distributed in a band around the equator thereof, confining a mass of sodium in a vessel surrounding the shell and attached thereto, rotating the reactor so that drops of fuel flow outwardly through said openings in the shell and through the mass of sodium to the periphery thereof, returning the fuel to the interior of the shell, and controlling the reactor by controlling the rate of return of fuel to the shell and the rate of rotation of the reactor.

References Cited
UNITED STATES PATENTS

| | | |
|---|---|---|
| 2,968,602 | 1/1961 | Loeb. |
| 3,009,866 | 11/1961 | Fraas et al. _____ 176—49 |
| 3,041,263 | 6/1962 | Kiehn et al. _____ 176—49 |
| 3,161,570 | 12/1964 | Hammond et al. _____ 176—49 |

OTHER REFERENCES
AEC Report, LA-2327, June 1959.
AEC Report, LA-2833, January 1962.

CARL D. QUARFORTH, *Primary Examiner.*

H. E. BEHREND, *Assistant Examiner.*